United States Patent
Chauhan et al.

(10) Patent No.: US 11,527,250 B2
(45) Date of Patent: Dec. 13, 2022

(54) METHOD AND SYSTEM FOR MOBILE DATA COMMUNICATION

(71) Applicant: Bank of America Corporation, Charlotte, NC (US)

(72) Inventors: Sandeep Kumar Chauhan, Hyderabad (IN); Udaya Kumar Raju Ratnakaram, Hyderabad (IN)

(73) Assignee: Bank of America Corporation, Charlotte, NC (US)

(*) Notice: Subject to any disclaimer, the term of this patent is extended or adjusted under 35 U.S.C. 154(b) by 173 days.

(21) Appl. No.: 16/918,811

(22) Filed: Jul. 1, 2020

(65) Prior Publication Data

US 2022/0004607 A1 Jan. 6, 2022

(51) Int. Cl.
| | |
|---|---|
| *G10L 17/22* | (2013.01) |
| *G06F 21/32* | (2013.01) |
| *G06N 20/00* | (2019.01) |
| *G10L 17/00* | (2013.01) |
| *H04L 67/55* | (2022.01) |

(52) U.S. Cl.
CPC ............ *G10L 17/22* (2013.01); *G06F 21/32* (2013.01); *G06N 20/00* (2019.01); *G10L 17/00* (2013.01); *H04L 67/55* (2022.05)

(58) Field of Classification Search
CPC .......... G10L 15/22; G10L 17/22; G06F 21/32
See application file for complete search history.

(56) References Cited

U.S. PATENT DOCUMENTS

| | | |
|---|---|---|
| 7,739,345 B2 | 6/2010 | Heinzel et al. |
| 8,275,119 B2 | 9/2012 | Kahn |
| 8,594,283 B2 | 11/2013 | Hogan et al. |
| 9,009,307 B2 | 4/2015 | Jain et al. |
| 9,148,869 B2 | 9/2015 | Van Heerden et al. |
| 9,219,639 B2 | 12/2015 | Jain et al. |
| 9,632,984 B2 | 4/2017 | Starikova et al. |
| 9,672,717 B1 | 6/2017 | Slavin et al. |
| 10,110,699 B2 | 10/2018 | Kunjithapatham et al. |
| 10,880,384 B1* | 12/2020 | Li ............................ G06F 3/167 |
| 11,107,462 B1* | 8/2021 | Fuegen ................... G10L 15/22 |
| 2005/0107070 A1* | 5/2005 | Geupel ..................... G07C 9/37 455/411 |
| 2006/0206352 A1* | 9/2006 | Pulianda .............. G06Q 10/103 705/319 |

(Continued)

*Primary Examiner* — Douglas Godbold
(74) *Attorney, Agent, or Firm* — Banner & Witcoff, Ltd.

(57) ABSTRACT

Methods, systems, and computing platforms for mobile data communication are disclosed. Processor(s) may be configured to electronically receive a plurality of user mobile interaction data to initiate a session on processing server. The processor(s) may be configured to electronically process the user mobile interaction data with AI including predefined user activity data for actions. The processor(s) may be configured to electronically determine whether one of more of the user mobile voice data samples includes a session key data command and responsive to the session key data command, electronically initiating a biometric authentication of the user mobile voice data samples. In some implementations, the system processor(s) may be configured to electronically initiate a second computing session for the computer platform while receiving the plurality of user mobile interaction voice data.

20 Claims, 8 Drawing Sheets

(56) References Cited

U.S. PATENT DOCUMENTS

| | | | | |
|---|---|---|---|---|
| 2011/0040724 | A1* | 2/2011 | Dircz | G06Q 10/10 |
| | | | | 709/224 |
| 2017/0018014 | A1* | 1/2017 | Dinion | G06Q 30/0603 |
| 2017/0329910 | A1* | 11/2017 | Seiwanes | G06Q 30/06 |
| 2020/0026838 | A1* | 1/2020 | Choi | G10L 15/22 |
| 2020/0126137 | A1* | 4/2020 | Pilkington | G16H 10/60 |
| 2020/0272732 | A1* | 8/2020 | Kurian | G06F 21/16 |
| 2020/0302423 | A1* | 9/2020 | Vijayaraghavan | G06Q 20/322 |
| 2020/0329144 | A1* | 10/2020 | Morgan | H04L 51/02 |
| 2021/0043189 | A1* | 2/2021 | Pyun | H04L 12/18 |
| 2021/0097158 | A1* | 4/2021 | Lee | G06F 21/45 |

* cited by examiner

METHOD AND SYSTEM FOR MOBILE DATA COMMUNICATION

FIELD OF THE DISCLOSURE

The present disclosure relates to methods, systems, and computing platforms for mobile data communication.

BACKGROUND

In the internet-of-things era, many digital products can be connected to the internet. Enterprise organizations utilize various computing infrastructure to make decisions and trigger actions. The computing infrastructure may include computer servers, computer networks, and sensors. Such an environment may include the Internet of Things (IoT). Often time, an IoT environment generates a plethora of raw data that can overwhelm an enterprise organization. As the digital economy continues to develop, data communications have become a formidable task in the internet-of-things era.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

One aspect of the present disclosure relates to a system configured for mobile data communication. The system may include one or more hardware processors configured by machine-readable instructions. The processor(s) may be configured to electronically establish two different simultaneous sessions with server to authenticate both a plurality of users with an artificial intelligence module and handle the plurality user e-communication data asynchronously. In some implementations, the system processor(s) may be configured to create secure multiple dynamic distributed communication channels for a plurality of the users and provide asynchronous communications for multiple user sessions. In some implementations, the system processor(s) may be configured to create a secure dynamic distributed communication channel via biometric voice print ID for a plurality of the users.

In some implementations, the system processor(s) may be configured to electronically process a plurality of mobile user interaction data for a first computing session for a computing platform. The system processor(s) may be configured to electronically receive a plurality of user mobile interaction voice data for in an AI computing platform. In some implementations, the system processor(s) may be configured to electronically sample the user mobile interaction voice data to create a set of user mobile voices data samples. In some implementations, the system processor(s) may be configured to electronically determine whether one of more of the user mobile voice data samples includes a session key data command and responsive to the session key data command, electronically initiating a biometric authentication of the user mobile voice data samples. In some implementations, the system processor(s) may be configured to electronically initiate a second computing session for the computer platform while receiving the plurality of user mobile interaction voice data.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

In the following description of the various embodiments, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
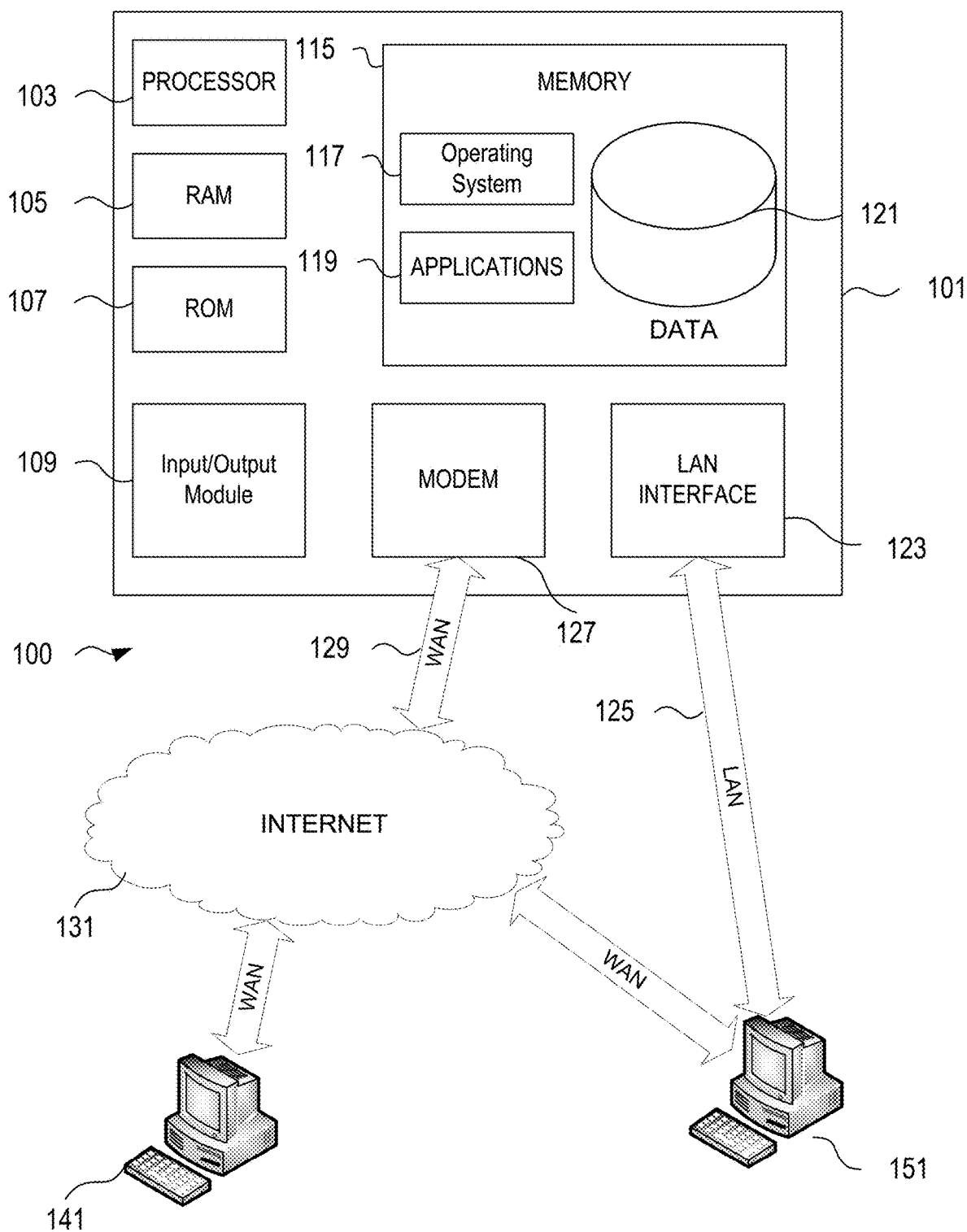
FIG. 1 illustrates a schematic diagram of a digital computing environment in which certain aspects of the present disclosure may be implemented.

FIG. 1 illustrates a block diagram of a specific programmed computing device 101 (e.g., a computer server) that may be used according to an illustrative embodiment of the disclosure. The computer server 101 may have a processor 103 for controlling overall operation of the server and its associated components, including RAM 105, ROM 107, input/output module 109, and memory 115.

Input/Output (I/O) 109 may include a microphone, keypad, touch screen, camera, and/or stylus through which a user of device 101 may provide input, and may also include one or more of a speaker for providing audio output and a video display device for providing textual, audiovisual and/ or graphical output. Other I/O devices through which a user and/or other device may provide input to device 101 also may be included. Software may be stored within memory 115 and/or storage to provide computer readable instructions to processor 103 for enabling server 101 to perform various technologic functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with vendors and patrons, allowing functional interoperability between different elements located at multiple physical locations.

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various protocols such as TCP/IP, Ethernet, FTP, HTTP and the like is presumed.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, mobile computing devices, e.g., smart phones, wearable computing devices, tablets, distributed computing environments that include any of the above systems or devices, and the like.

The disclosure may be described in the context of computer-executable instructions, such as program modules, being executed by a computer. Generally, program modules include routines, programs, objects, components, data structures, etc. that perform particular tasks or implement particular computer data types. The disclosure may also be practiced in distributed computing environments where tasks are performed by remote processing devices that are linked through a communications network. In a distributed computing environment, program modules may be located in both local and remote computer storage media including memory storage devices.

Figure 2:
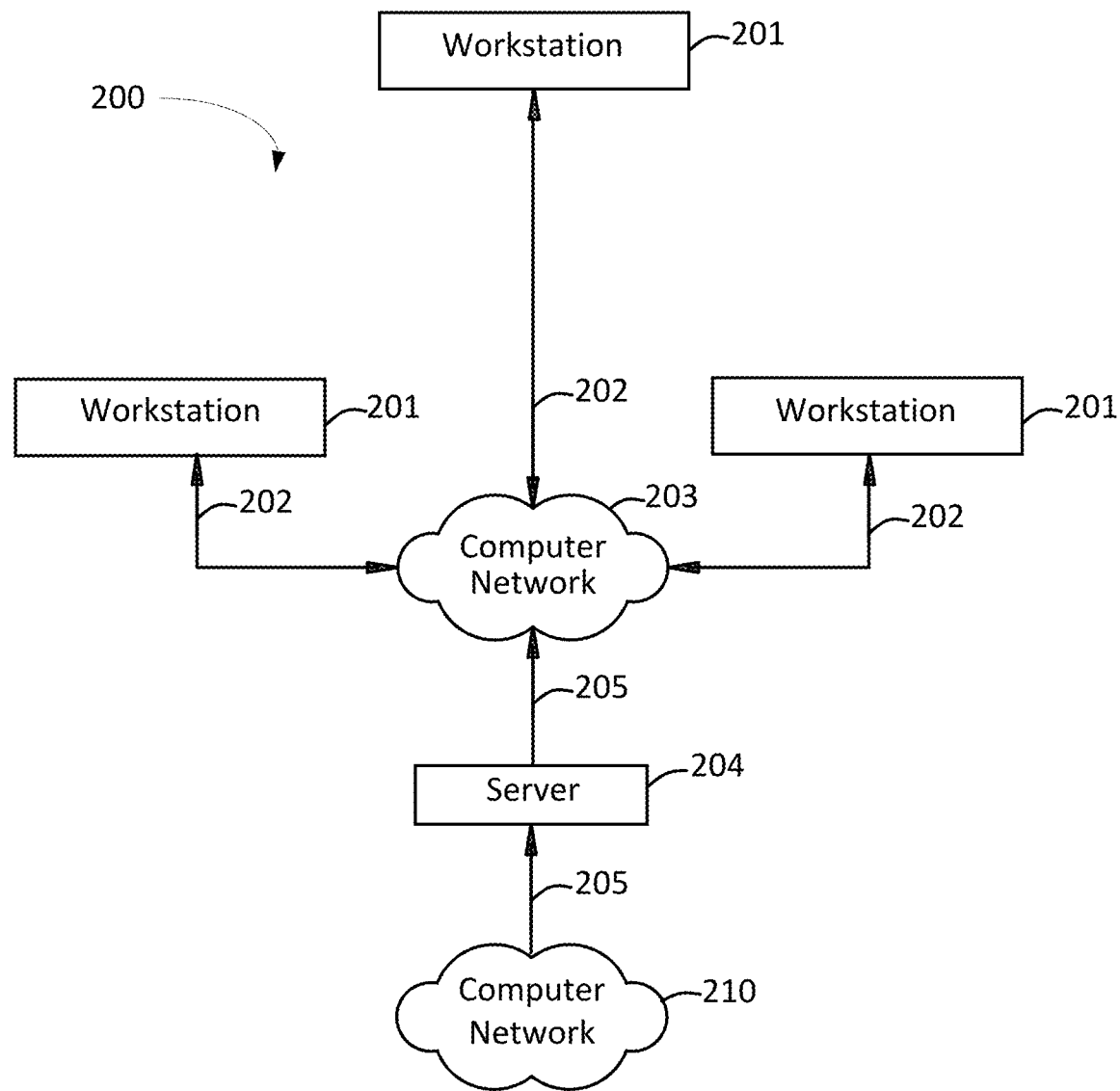
FIG. 2 is an illustrative block diagram of workstations and servers that may be used to implement the processes and functions of certain embodiments of the present disclosure.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer networks 203, 210 that is linked via communications links 205 to server 204. In system 200, server 204 may be any suitable server, processor, computer, or data processing device, or combination of the same. Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

Figure 3:
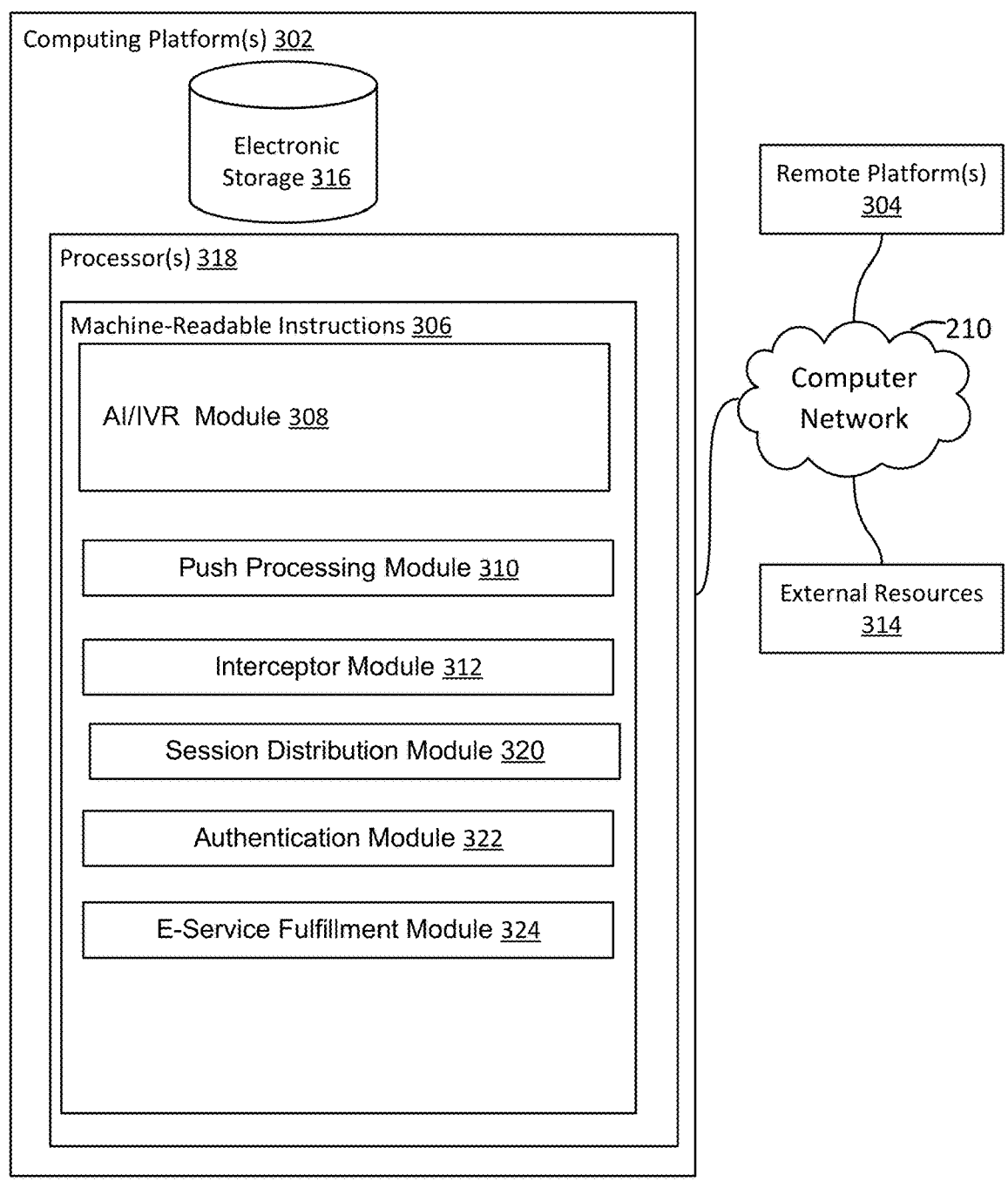
FIG. 3 illustrates a system configured for data communication, in accordance with one or more implementations.

FIG. 3 illustrates a system 300 configured for data communication, in accordance with one or more implementations. In some implementations, system 300 may include one or more computing platforms 302. Computing platform(s) 302 may be configured to communicate with one or more remote platforms 304 according to a client/server architecture, a peer-to-peer architecture, and/or other architectures. Remote platform(s) 304 may be configured to communicate with other remote platforms via computing platform(s) 302 and/or according to a client/server architecture, a peer-to-peer architecture, and/or other architectures. Users may access system 300 via remote platform(s) 304.

Computing platform(s) 302 may be configured by machine-readable instructions 306. Machine-readable instructions 306 may include one or more instruction modules. The instruction modules may include computer program modules. The instruction modules may include one or more of AI/IVR module 308, push processing module 310, interceptor module 312, session distribution module 320, authentication module 322, e-service fulfillment module 324 and/or other instruction modules.

The modules 308, 310, 312, 320, 322, 324 and other modules implement APIs containing functions/sub-routines which can be executed by another software system, such as email and internet access controls. API denotes an Application Programming Interface. The systems and methods of the present disclosure can be implemented in various technological computing environments including Simple Object Access Protocol (SOAP) or in the Representational State Transfer (REST). REST is the software architectural style of the World Wide Web. REST APIs are networked APIs that can be published to allow diverse clients, such as mobile applications, to integrate with the organizations software services and content. Many commonly-used applications work using REST APIs as understood by a person of skill in the art.

Figure 8:
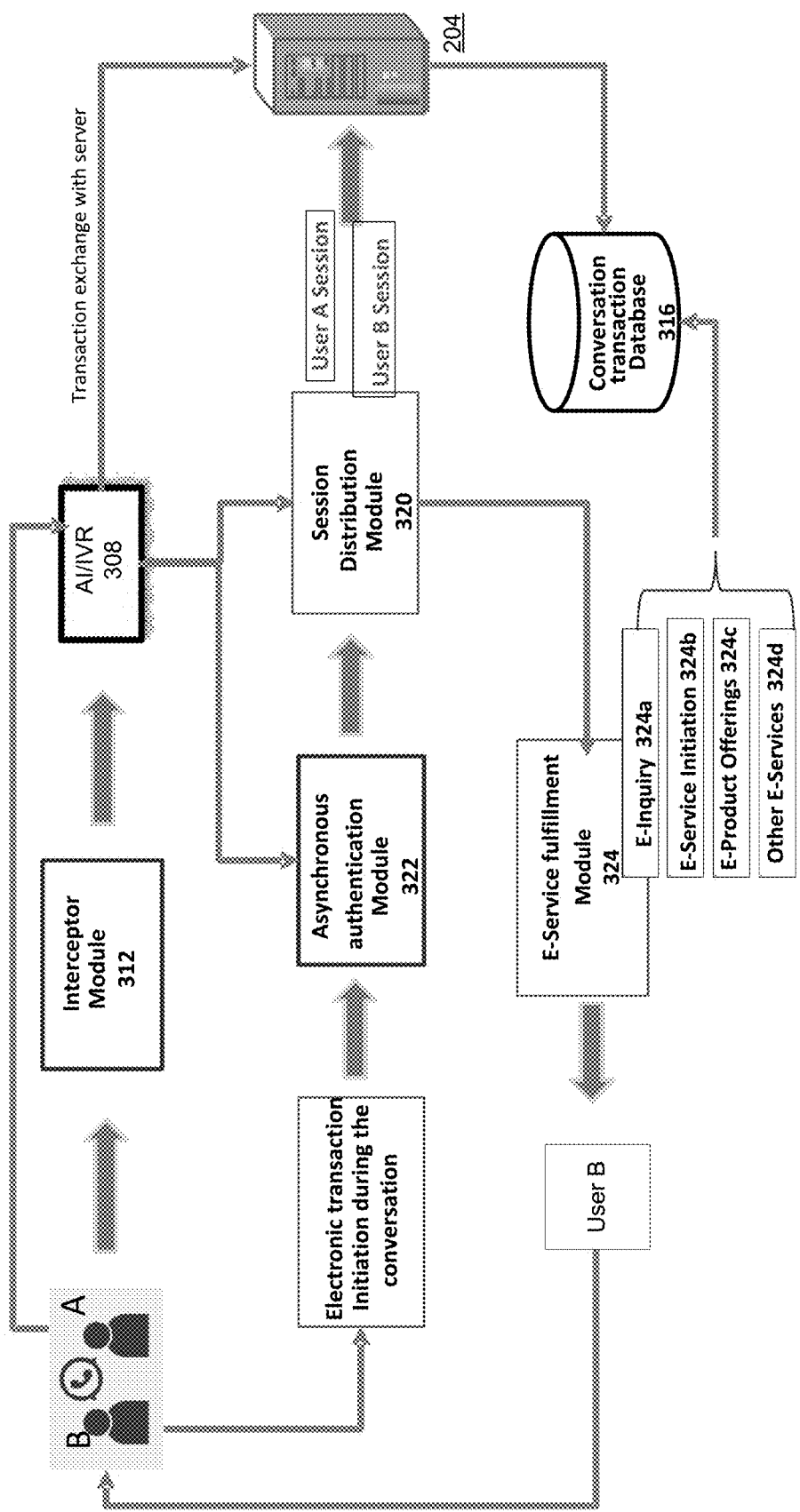
FIG. 8 is an illustrative block diagram of a computing environment that may be used to implement the processes and functions of certain embodiments.

Referring to FIGS. 3 and 8, the system 300 is configured to reduce the processing overhead and increase efficiency involved in the user e-interactions with voice channels, where the user spends more time in explaining and engaging in an e-service transaction. In one implementation, during a voice conversation over a call between two users A and B, the conversations may lead to e-service transactions and demands an e-ecommerce interaction by the user B with mobile device 700 that does not have the AI/IVR connection client application on the user device.

In some implementations, AI/IVR module 308 may establish two different simultaneous sessions with server to authenticate both the users with module 322 and handle the two users e-communication data asynchronously. In some implementations, the system 300 creates a secure dynamic distributed communication channel to solve the needs of both the user A and user B. Likewise, the phone conversation can be between multiple users.

In some implementations, the system 300 can provide messages in the communication cycle in an authenticated format, secure for each user that would be authorized to be a part of the secure dynamic distributed communication channel. For example, an IPSEC circuit is commonly to pertain to IP Security, a set of protocols to support secure exchange of packet at the IP layer in a TCP/IP network system. IPSEC systems have been deployed widely to implement Virtual Private Networks (VPNs). Under an IPSEC system, at least two encryption modes are supported: Transport and Tunnel. Transport mode encrypts only the payload portion of each packet, but leaves the header. The Tunnel mode encrypts both the header and the payload. On the receiving side, an IPSEC-compliant device decrypts each packet.

Some aspects of various exemplary constructions are described by referring to and/or using neural network(s). AI/IVR module 308 may be configured to electronically process with a machine learning processor and/or natural language processor to process the voice of the user and provide e-service transactions with server. Various structural elements of neural network includes layers (input, output, and hidden layers), nodes (or cells) for each, and connections among the nodes. Each node is connected to other nodes and has a nodal value (or a weight) and each connection can also have a weight. The initial nodal values and connections can be random or uniform. A nodal value/weight can be negative, positive, small, large, or zero after a training session with training data set. Computer networks 203, 201 may incorporate various machine intelligence (MI) neutral network 500 (see FIG. 5) features of available Tensorflow (https://www.tensorflow.org) or Neuroph software development platforms (which are incorporated by reference hererin).

Figure 5:
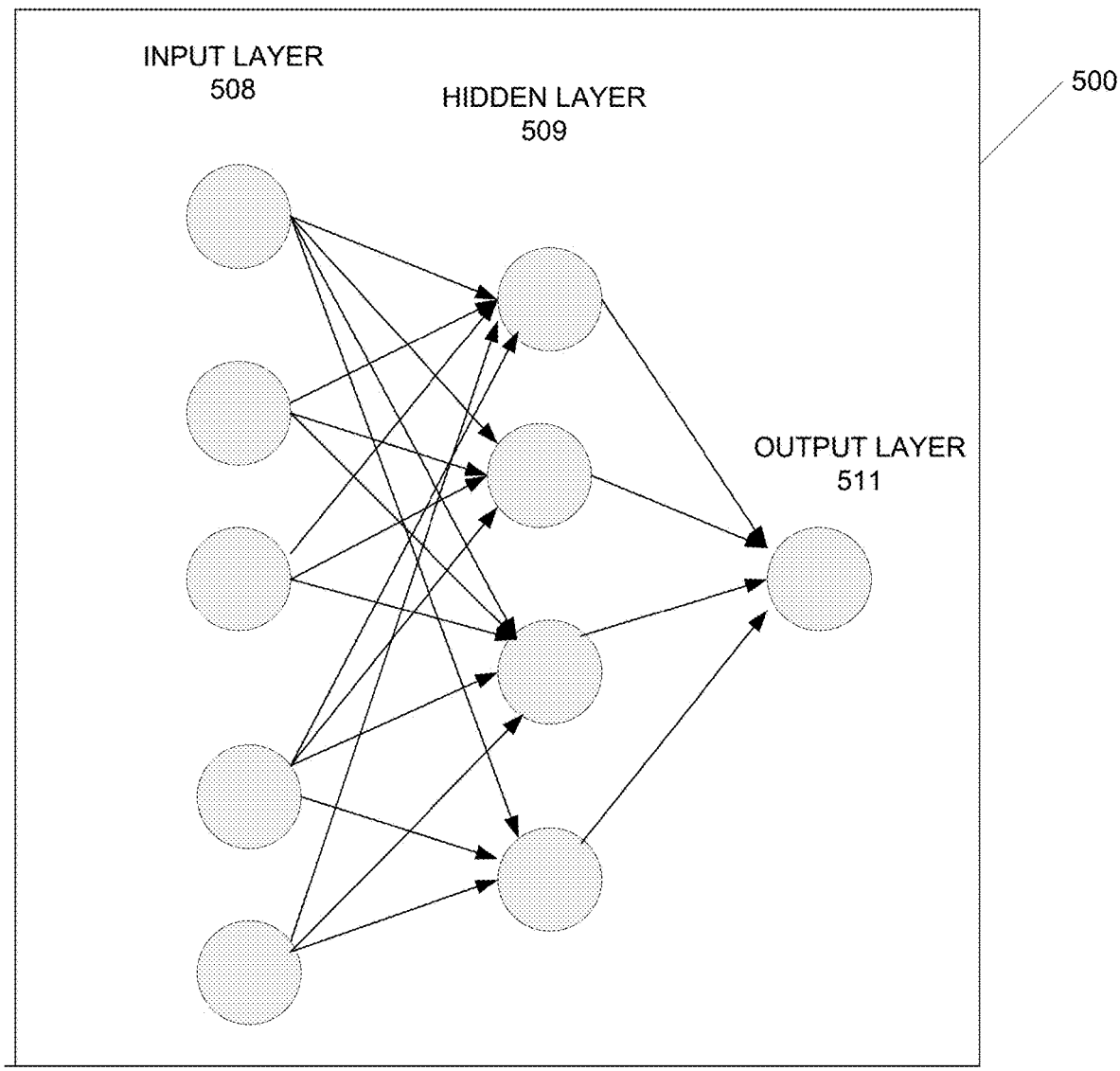
FIG. 5 is an illustrative functional block diagram of a neural network that may be used to implement the processes and functions, in accordance with one or more implementations.
Figure 6:
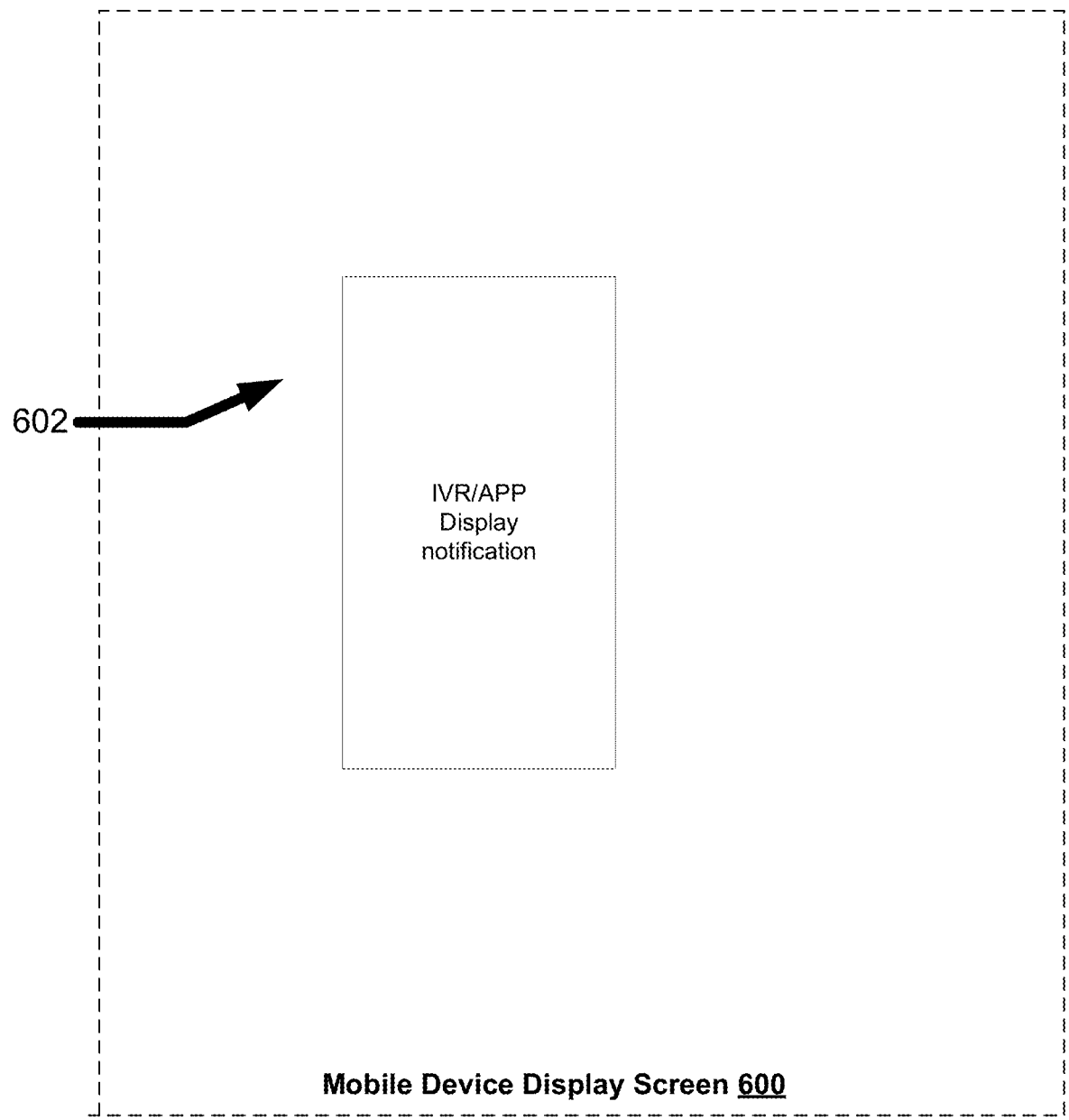
FIG. 6 is an illustrative block diagram of a display screen mobile device that may be used to implement the processes and functions of certain embodiments.

Referring to FIG. 5, neural network 500 is generally arranged in "layers" of node processing units serving as simulated neutrons, such that there is an input layer 508, representing the input fields into the network. To provide the automated machine learning processing, one or more hidden layers 509 with machine learning rule sets processes the input data. An output layer 511 provides the result of the processing of the network data.

The computer readable database 316 may include the "attribute data" including ASCII characters in computer readable form or binary complied data. The ASCII characters or binary data can be manipulated in the software of system 300. The database 316 may store data in computer readable format or in ASCII or other form. The system may use various attribute data in the Electronic Data Interchange (EDI) format. EDI messages can be electronically processed according any number of formats and data sequences. User A and User B with mobile device 700 may securely register to system 300 via a website URL registration service, an in-person registration service, a mail-in registration service, and/or some other registration service. A biometric device system may be included to allow for scanning of an iris of the user, retina scan, face recognition, voice print and/or other types of biometric identification and authentication, including fingerprint scan analysis.

With continued reference to FIGS. 3 and 8, AI/IVR module 308 may have a mobile client-side application residing on the mobile device 700 of a user and a service side application that electronically work together to electronically process a plurality of mobile user interaction data for a first computing session for a computing platform/service 204. In one implementation, the plurality of mobile user interaction data pertains to device 700 of User A having an existing session with server 204.

In some implementations, interceptor module 312 may electronically interact with authenticate module 322 to authenticate the user B based on the biometric voice print ID. The interceptor module 312 may be configured to recognize a key trigger word to start another session with the service. The key trigger word may be any of a number of combinations language conventions, such as "start session two for a new user" or "session two" or "initiate new session". AI/IVR module 308 may learn the patterns of user B and voice recognition to start a session during the phone conversation with User A.

In some implementations, module 310 displays the push notification 602 on the mobile device 700 of User B, such as on device screen 600. System 300 includes module 310 that sends a push notification based on results of AI/IVR module 308, wherein the mobile devices 700 can receive inquiries, via an automatic push notification or an electronic mail, text messaging via Short Messaging Service (SMS) component of phone, web, or mobile communication systems, using standardized communication protocols that allow the exchange of short text messages between fixed line or mobile phone devices. In another manner, the mobile device 700 may receive inquiries via a pull format where the inquirer initiates the query at various steps and the notification can be electronic mail or Short Messaging Service technology for cellular phones.

In some implementations, e-service fulfillment module 324 includes computer readable instructions and logic for provide digital products, ecommerce and other e-services for User B and User A. The digital products and digital service from module 324 may include e-inquiry 324a, e-service initiation 324b, e-products, e-goods 324c, and other e-services 324d. The data from the module 324 may be stored in database 316 for processing and related actions.

In some implementations, computing platform(s) 302, remote platform(s) 304, and/or external resources 314 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 302, remote platform(s) 304, and/or external resources 314 may be operatively linked via some other communication media.

A given remote platform 304 may include one or more processors configured to execute computer program modules. The computer program modules may be configured to enable an expert or user associated with the given remote platform 304 to interface with system 300 and/or external resources 314, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms.

External resources 314 may include sources of information outside of system 300, external entities participating with system 300, and/or other resources. In some implementations, some or all of the functionality attributed herein to external resources 314 may be provided by resources included in system 300.

Computing platform(s) 302 may include electronic storage 316, one or more processors 318, and/or other components. Computing platform(s) 302 may include communication lines, or ports to enable the exchange of information with a network and/or other computing platforms. Illustration of computing platform(s) 302 in FIG. 3 is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302.

Electronic storage 316 may comprise non-transitory storage media that electronically stores information. The electronic storage media of electronic storage 316 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 316 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 316 may include one or more virtual storage resources (e.g., cloud storage, a virtual private network, and/or other virtual storage resources). Electronic storage 316 may store software algorithms, information determined by processor(s) 318, information received from computing platform(s) 302, information received from remote platform(s) 304, and/or other information that enables computing platform(s) 302 to function as described herein.

Processor(s) 318 may be configured to provide information processing capabilities in computing platform(s) 302. As such, processor(s) 318 may include one or more of a digital processor, an analog processor, a digital circuit designed to process information, an analog circuit designed to process information, a state machine, and/or other mechanisms for electronically processing information. Although processor(s) 318 is shown in FIG. 3 as a single entity, this is for illustrative purposes only. In some implementations, processor(s) 318 may include a plurality of processing units. These processing units may be physically located within the same device, or processor(s) 318 may represent processing functionality of a plurality of devices operating in coordination. Processor(s) 318 may be configured to execute modules 308, 310, 312, 322, 324 and/or other modules. Processor(s) 318 may be configured to execute modules 308, 310, and/or 312, and/or other modules by software; hardware; firmware; some combination of software, hardware, and/or firmware; and/or other mechanisms for configuring processing capabilities on processor(s) 318. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 320, 322 and/or 324 are illustrated in FIG. 3 as being implemented within a single processing unit, in implementations in which processor(s) 318 includes multiple processing units, one or more of modules 308, 310, 312, 320, 322 and/or 324 may be implemented remotely from the other modules. The description of the functionality provided by the different modules 308, 310, 312, 320, 322 and/or 324 described below is for illustrative purposes, and is not intended to be limiting, as any of modules 308, 310, 312, 320, 322 and/or 324 may provide more or less functionality than is described. For example, one or more of modules 308, 310, 312, 320, 322 and/or 324 may be eliminated, and some or all of its functionality may be provided by other ones of modules 308, 310, 312, 320, 322 and/or 324. As another example, processor(s) 318 may be configured to execute one or more additional modules that may perform some or all of the functionality attributed below to one of modules 308, 310, 312, 320, 322 and/or 324.

Figure 4A:
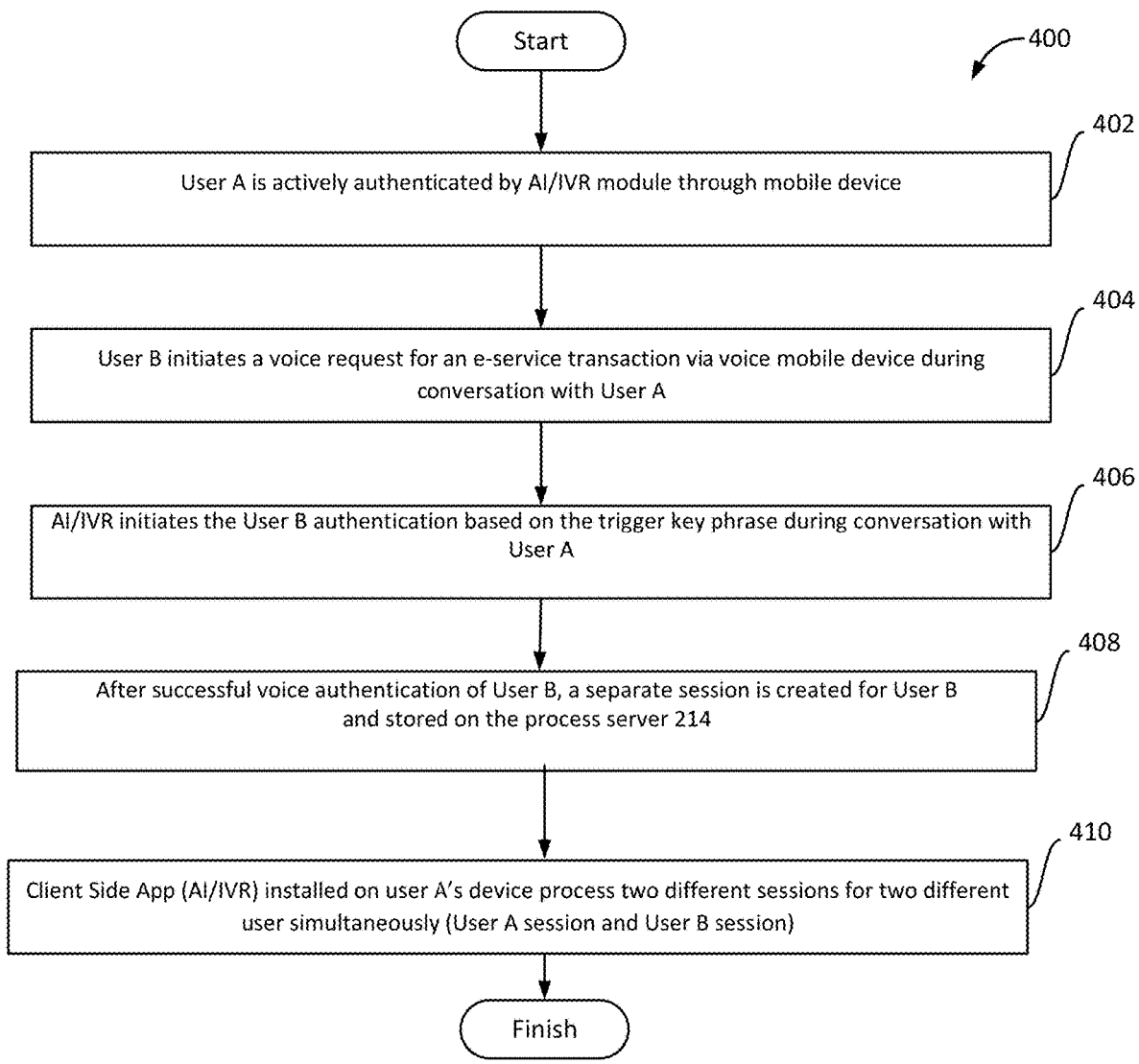
FIGS. 4A and 4B illustrate a method for data communication, in accordance with one or more implementations.

FIGS. 4A and/or 4B illustrate a method 400 for data communication, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIGS. 4A and/or 4B and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

FIG. 4A illustrates method 400, in accordance with one or more implementations. An operation 402 may include electronically processing plurality of mobile user interaction data (e.g., the computer readable mobile data) of User A to actively authenticate the mobile device 700 by AI/IVR module 308 for a first computing session for a computing platform/service 204. Operation 402 may be performed by one or more hardware processors configured by machine-readable instructions including module that is the same as or similar to AI/IVR module 308 in accordance with one or more implementations.

An operation 404 may include electronically processing data such that User B sends a voice request for an e-transaction by way of the same voice call with User A. In some implementations, operation 404 includes electronically receiving a plurality of user mobile interaction voice data for an AI computing platform. That is, the voice request is transmitted through the mobile device 700 of User A. The mobile device 700 of User A already has a session of the e-service via the AI/IVR module 308 on server 204. Operation 404 may be performed by one or more hardware processors configured by machine-readable instructions including a module that is the same as or similar to processing module 308 and interceptor module 312, in accordance with one or more implementations.

An operation 406 may include electronically sampling user voice data to recognize User B authentication voice based on the trigger key phrase, such as a session key data command, during the same voice call with User A. In some implementations, operation 406 may include electronically sampling the user mobile interaction voice data of the conversation between User A and User B to create a set of user mobile voices data samples. Further, operations 406 may include electronically determining whether one of more of the user mobile voice data samples includes the session key data command; and responsive to the session key data command, operation 404 may include electronically initiating a biometric authentication (e.g., voice print ID) of the user mobile voice data samples. Operation 406 may be performed by one or more hardware processors configured by machine-readable instructions including a module that is the same as or similar to interceptor module 312 and authentication module 322, in accordance with one or more implementations.

An operation 408 may include after successful voice authentication of User B, a separate session may be created for User B and stored on the server 204. In some implementations, operation 410 includes processors configured to create secure multiple dynamic distributed communication channels for a plurality of the users and/or provide asynchronous communications for multiple user sessions. In some implementations, the system processor(s) may be configured to create a secure dynamic distributed communication channel via biometric voice print ID for a plurality of the users. In this way, multiple separate electronically sessions for different Users A and B are created. Operation 408 may be performed by one or more hardware processors configured by machine-readable instructions including a module that is the same as or similar to session distribution module 320 and authentication module 322, in accordance with one or more implementations.

An operation 410 may include client-side AI/IVR module 308 installed on user A's device 700 to electronically process two different sessions for two different users simultaneously. In some implementations, operation 410 may include responsive to the biometric authentication in operation 408, electronically initiating a second computing session for the computer platform 204 while receiving the plurality of user mobile interaction voice data during the phone call between User A and User B. Operation 410 may be performed by one or more hardware processors configured by machine-readable instructions including a module that is the same as or similar to session distribution module 320, in accordance with one or more implementations.

Figure 4B:
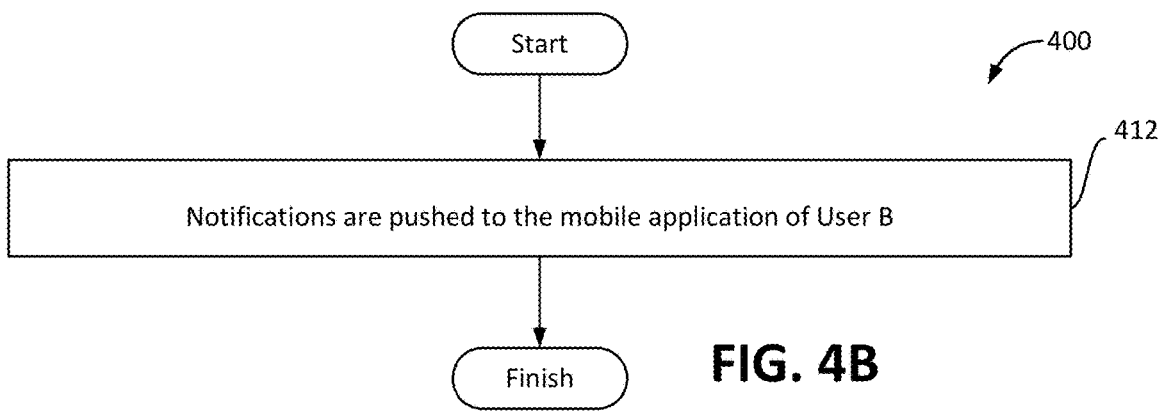

FIG. 4B illustrates method 400, in accordance with one or more implementations. An operation 412 may include further including electronically processing one or more push notifications of the various e-service transactions of User B to the mobile device 700 of User B, instead of the mobile device of User A. Operation 412 may be performed by one or more hardware processors configured by machine-readable instructions including a module that is the same as or similar to module 310 and AI/IVR module 308, in accordance with one or more implementations.

Figure 7:
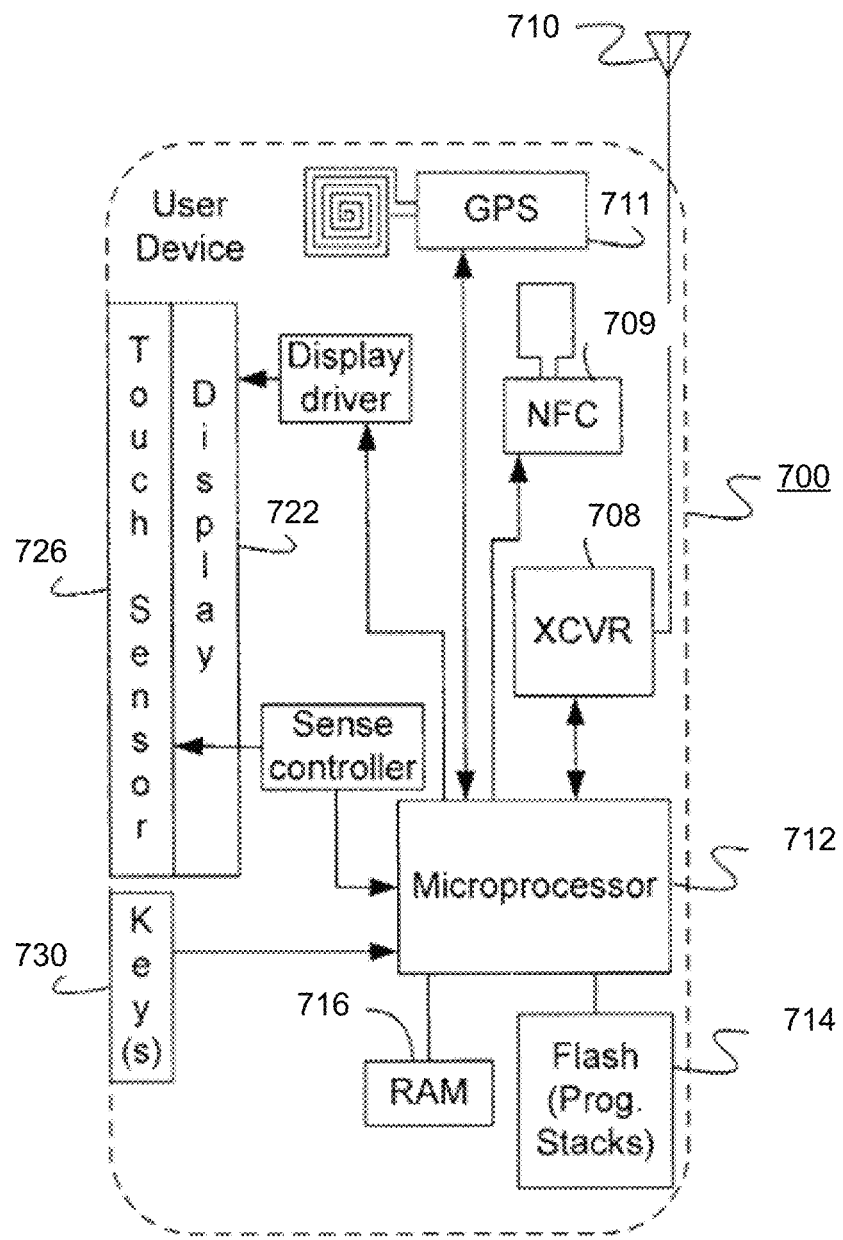
FIG. 7 is an illustrative block diagram of a mobile digital computing environment that may be used to implement the processes and functions of certain embodiments.

FIG. 7 provides a block diagram illustration of an exemplary user device 700. Although the user device 700 may be a smart-phone, a tablet, or another type of device, the illustration shows the user 700 is in the form of a handset (although many components of the handset, such as a microphone and speaker, are not shown).

Referring to FIGS. 7 and 8, for digital wireless communications, the user device 700 includes at least one digital transceiver (XCVR) 708 connected to an antenna 710 that receives data packets uploads and downloads using cell tower transmissions with an information alert (e.g., push notification) from an Over-The-Air Transmitter 802. The transceiver 708 provides two-way wireless communication of information, such as digital information, in accordance with the technology of the network 15. The transceiver 708 also sends and receives a variety of signaling messages in support of the various services provided via the user device 700 and the communication network. The user device 700 also includes an NFC interface 709 having an associated antenna and configured for communicating using near-field communication with other devices such as with an NFC reader. The user device 700 includes a display 722 for displaying messages, menus or the like, user related information for the user, etc. A touch sensor 726 and keypad 730 enables the user to generate selection inputs, for example.

A microprocessor 712 serves as a programmable controller for the user device 700, in that it controls all operations of the user device 700 in accord with programming that it executes, for all normal operations, and for operations involved in the real-time parking guidance service. In the example, the user device 700 includes flash type program memory 714, for storage of various program routines and configuration settings. The user device 700 may also include a non-volatile random access memory (RAM) 716 for a working data processing memory. In a present implementation, the flash type program memory 714 stores any of a wide variety of applications, such as navigation application software and/or modules 308, 310, 312, 320, and 322. The memories 714, 716 also store various data, such as input by the user. Programming stored in the flash type program memory 714 is loaded into and executed by the microprocessor 712 to configure the processor 712 to perform various desired functions, including functions involved in push notification processing.

In some examples, the user device 700 further includes a GPS interface 711 coupled to a GPS antenna designed to receive GPS location signals transmitted by satellites. The GPS interface 711 is communicatively coupled to the microprocessor 712, and is operative to provide location information to the microprocessor based on the received location signals.

In one construction, a biometric device system located in Device 700 may be included to enable for securely storing in the device biometric data unique to the user, and/or securely storing in the device behavioral/gating data associated with the user. The electronic biometric data and behavioral/gating data can be maintained, or otherwise stored within a memory/database, such as memory 714 and/or RAM 105 as shown in FIG. 1 in which memory in located within the device (e.g., smart phones).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An electronic computer implemented method of mobile data communication, comprising, the steps of:
    electronically processing a plurality of mobile user interaction data for a first computing session of a computing platform;
    electronically receiving a plurality of user mobile interaction voice data for an AI-based computing platform;
    electronically sampling the user mobile interaction voice data to create a set of user mobile voice data samples;
    electronically determining whether one of more of the user mobile voice data samples includes a session key data command; and
    responsive to the session key data command, electronically initiating a biometric authentication of the user mobile voice data samples;

responsive to the biometric authentication, electronically initiating a second computing session of the computer platform, while receiving the plurality of user mobile interaction voice data; wherein said biometric authentication is associated with a second user for the second computing session and said first computing session is associated with a first user; wherein said plurality of user mobile interaction voice data is associated with the first user and the second user; and wherein the second computing session occurs simultaneously with said first computing session.

2. The method of claim 1, further comprising responsive to the biometric authentication, electronically processing the user mobile voice data samples for a voice print ID of the second user associated with the second computing session of the computing platform.

3. The method of claim 1, wherein the first computing session and the second computing session each comprise a secure multiple dynamic distributed communication channel.

4. The method of claim 1, wherein the first computing session and the second computing session each operate asynchronously.

5. The method of claim 1, wherein the AI-based computing platform comprises machine learning.

6. The method of claim 1, further comprising transmitting at least one push notification for a mobile device associated with the second computing session.

7. A system configured for mobile data communication, the system comprising:
one or more hardware processors configured by machine-readable instructions to:
electronically process a plurality of mobile user interaction data for a first computing session for a computing platform;
electronically receive a plurality of user mobile interaction voice data for an AI computing platform;
electronically sample the user mobile interaction voice data to create a set of user mobile voices data samples;
electronically determine whether one of more of the user mobile voice data sample includes a session key data command; and
responsive to the session key data command, electronically initiate a biometric authentication of the user mobile voice data samples;
responsive to the biometric authentication, electronically initiating a second computing session for the computer platform while receiving the plurality of user mobile interaction voice data; wherein said biometric authentication is associated with a second user for the second computing session and said first computing session is associated with a first user;
wherein said plurality of user mobile interaction voice data is associated with the first user and the second user; and wherein the second computing session occurs simultaneously with said first computing session.

8. The system of claim 7, wherein the one or more hardware processors are further configured by machine-readable instructions to electronically responsive to the biometric authentication, electronically processing the user mobile voice data samples for a voice print ID of the second user associated with the second computing session of the computing platform.

9. The system of claim 7, wherein the first computing session and the second computing session each comprise a secure multiple dynamic distributed communication channel.

10. The system of claim 7, wherein the first computing session and the second computing session are each configured to operate asynchronously.

11. The system of claim 7, wherein the AI-based computing platform comprises machine learning instructions.

12. The system of claim 7, wherein the one or more hardware processors are further configured by machine-readable instructions to electronically transmit at least one push notification for a mobile device associated with the second computing session.

13. The system of claim 12, wherein the push notification comprises an electronic EDI message.

14. The method of claim 12, wherein the push notification comprises a SMS message.

15. A computing platform configured for mobile data communication, the computing platform comprising:
a non-transient computer-readable storage medium having executable instructions embodied thereon; and
one or more hardware processors configured to execute the instructions to:
electronically process a plurality of mobile user interaction data for a first computing session for a computing module;
electronically receive a plurality of user mobile interaction voice data for an AI computing module;
electronically sample the user mobile interaction voice data to create a set of user mobile voices data samples;
electronically determine whether one of more of the user mobile voice data sample includes a session key data command;
responsive to the session key data command, electronically initiate a biometric authentication of the user mobile voice data samples; and
responsive to the biometric authentication, electronically initiate a second computing session for the computer module, while receiving the plurality of user mobile interaction voice data; wherein said biometric authentication is associated with a second user for the second computing session and said first computing session is associated with a first user;
wherein said plurality of user mobile interaction voice data is associated with the first user and the second user; and wherein the second computing session occurs simultaneously with said first computing session.

16. The computing platform of claim 15, wherein the one or more hardware processors are further configured by the instructions to electronically process the user mobile voice data samples for a voice print ID of the second user associated with the second computing session of the computing platform responsive to the biometric authentication.

17. The computing platform of claim 15, wherein the first computing session and the second computing session each comprise a secure multiple dynamic distributed communication channel.

18. The computing platform of claim 15, wherein the first computing session and the second computing session are each configured to operate asynchronously.

19. The computing platform of claim 15, wherein the one or more hardware processors are further configured by instructions to electronically transmit at least one push notification for a mobile device associated with the second computing session.

20. The computing platform of claim 15, wherein the AI-based computing module comprises machine learning instructions.

* * * * *